Figure 1:
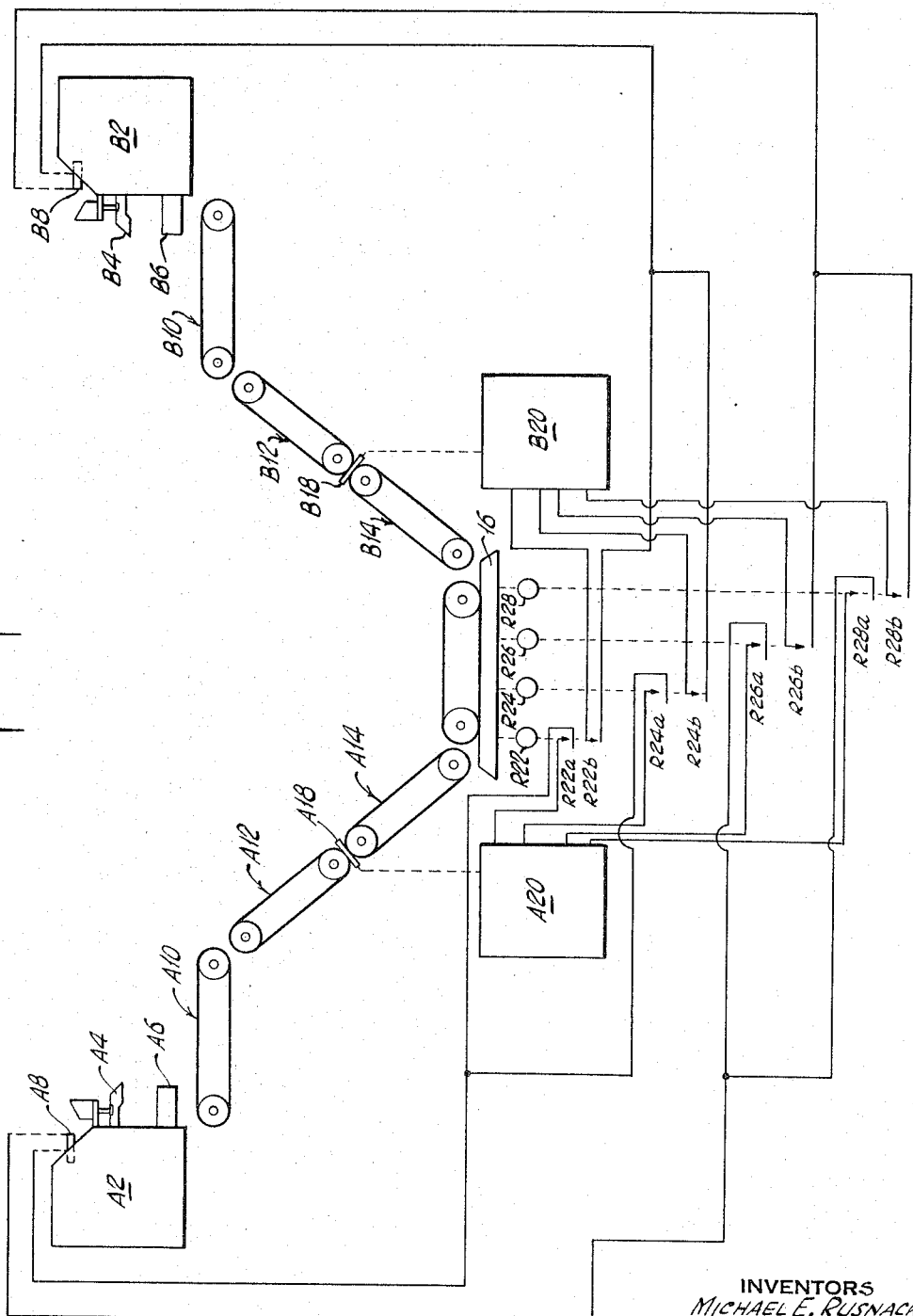

United States Patent Office 3,311,182
Patented Mar. 28, 1967

3,311,182
WEIGHT CONTROL FOR BAG PACKING MACHINES
Michael E. Rusnack, Hammond, and Joseph M. Kulesa, Schererville, Ind., assignors to American Maize-Products Co., a corporation of Maine
Filed Feb. 26, 1965, Ser. No. 435,619
6 Claims. (Cl. 177—45)

The present invention relates to a novel automatic control circuit for package filling machines to insure uniformity in weight of the filled packages.

In present day practice, a bag or container, after it is packed, is then weighed and if found to depart materially from the desired weight, an operator at the filling machine adjusts the machine to correct the amount of material fed to the next package to bring its weight within the desired limits. This involves substantial guesswork and time on the part of the operator as well as the rejection of many packages because of over- or under-weight. By the control system of the present invention, greater uniformity in the weight of the filled packages is automatically obtained.

The invention will be described in connection with a specific embodiment thereof and with reference to particular allowable range of weights, but obviously the invention is not limited to the specific details hereinafter given. The new system can be applied to the control of a single packing machine or to a plurality of such machines. When a plurality of packing machines are used, our invention has the advantage of being able to use a single weighing scale for controlling all the said machines.

The weighing scale involved in the system is one commercially available and which can be arranged to deliver four electrical signals indicative of weight, such as "Heavy," "O.K. Heavy," "Light" and "O.K. Light." If, for example a range, say 5 ounces, has been selected for the tolerance then, if the package being weighed is not more than 2½ ounces over-weight, the signal from the scale would be "O.K. Heavy" whereas, if the package being weighed is not less than 2½ ounces under-weight, the signal would be "O.K Light." Any weight more than 2½ ounces over the desired weight would yield a signal of "Heavy" and similarly for any weight more than 2½ ounces under-weight, the scale would transmit a signal of "Light."

The signals from the scale actuate relays controlling a reversible motor and the motor in turn controls and adjusts the packing machine. When the "O.K. Heavy" signal is received, the circuit provides for means to energize the motor for a predetermined time in a direction to decrease the amount of feed to the package at the filling station. When the "Heavy" signal is received from the scale, the motor is energized in the same direction but for a longer period of time. Conversely, when the "O.K. Light" or "Light" signal is received from the scale, the circuit operates to energize the motor in the reverse direction. The motor will run for a relatively short time when the "O.K. Light" signal is received and for a longer period of time when the "Light" signal is received.

The packages after being filled will be carried to the scale by conveyor belts. In the course of being carried to the scale, the packages will trip a switch which initiates operation of the control circuit associated with the signal receiving relays. The control circuit includes time delay relays which are so arranged as to bring the motor control into operation after the package has been received at the scale and weighed. When the system is used to control more than one filling station, means are provided in the control circuits to insure that the adjustment will be made at the particular station from which the package being weighed was received.

For a better understanding of the invention and of a particular control circuit embodying the same, reference may be had to the accompanying drawings of which—

Figure 2:
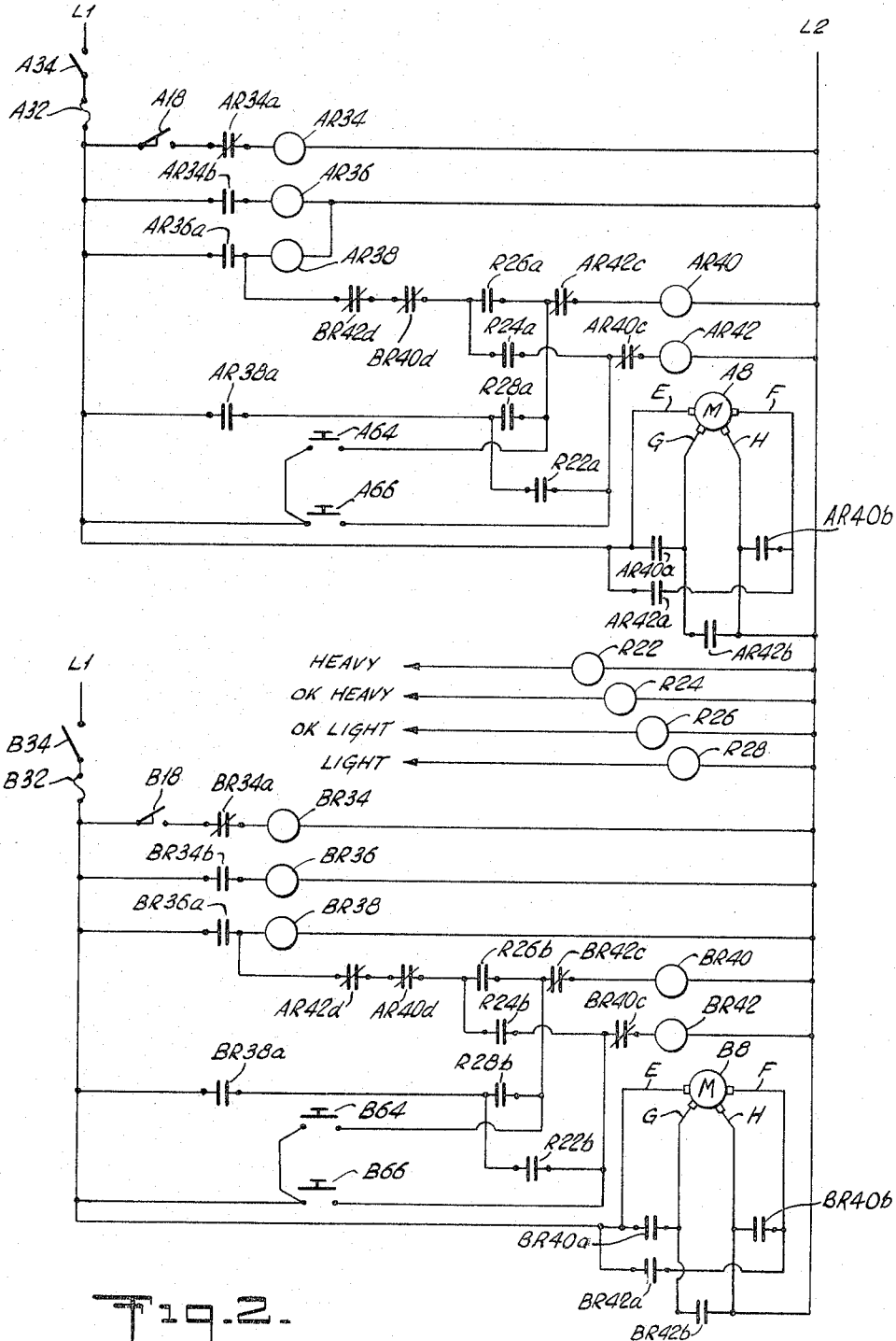

FIG. 1 is a diagrammatic representation of the control system of the invention as applied to two packing machines feeding filled packages to a single scale; and FIG. 2 is a wiring diagram showing the control circuits and relays of the system of FIG. 1.

For convenience in explaining the invention, applicant has used the same numbers to designate an item which is found in both the right and left packing machines and circuits relating thereto, but added the letter A before the reference number where applicant is talking about the packing machine on the left side and the letter B where applicant is referring to the other packing machine. Further, applicant, also as a matter of convenience, identified the contacts of a relay by using the same reference characteristic as the relay controlling the said contacts but followed the reference with a lower case letter. For example, contacts AR34a and AR34b are contacts controlled by relay AR34.

FIG. 1, which is a schematic representation, shows two filling stations A2 and B2 each of which may be of conventional construction having balance scales indicated diagrammatically at A4 and B4 respectively and exit chutes A6 and B6 respectively. Details of the filling machines are not shown, being no part of the present invention.

In general, the operation at each of the stations includes feeding material to the balance scales A4 and B4 until the scales tip in accordance with the position of a weight thereon. The material is then fed from the said scales to a package and the package is ejected through outlet A6 or B6 and delivered to a series of traveling belts which together form a chute for the package. The traveling belts are motor driven to control the speed of delivery of the filled packages.

In the particular weighing machines of FIG. 1, the position of the weight on the balance scale is controlled by reversible motors indicated diagrammatically at A8 and B8. The motors when caused to operate in one direction will move the weights on the balance scales in a direction which will increase the package weight before the trays A6 and B6 will tip. When the motors are caused to operate in the opposite direction, they will cause the weights to move in the reverse direction reducing the weight required for tipping the trays.

The traveling conveyors from station A2 are indicated at A10, A12 and A14 with the conveyor A14 delivering the filled package to the scale indicated diagrammatically at 16.

In accordance with the invention, a trip switch A18 is positioned between the conveyors A12 and A14 and this switch, A18, as will become clear from FIG. 2, is connected to the time delay control circuit for station A2 indicated by the block diagram A20. Similarly, a trip switch B18 is interposed between the conveyors B12 and B14 for actuation of the time delay control circuit indicated at B20 for station B2.

Scale 16 is provided with means, as heretofore mentioned, for producing four different signals, one corresponding to "Heavy," one to "O.K. Heavy," one to "O.K. Light" and one to "Light." These signals are used to energize relays R22, R24, R26 and R28 respectively.

Relay R22, when energized, closes two normally open sets of contacts R22a and R22b. Contacts R22a, when closed, connects a lead from the time delay control circuit A20 to the motor A8 and contacts R22b, when closed, connects the time delay control circuit B20 to motor B8. The contacts controlled by relay R22, corresponding to the "Heavy" signal, energize motor A8 or motor B8 in a direction to decrease the weight of the bags filled at the stations A2 or B2 respectively. Circuitry within the time delay control circuits A20 and B20 prevent energization of both motors A8 and B8 simultaneously. Further, since the filling stations A2 and B2 operate sequentially, the switches A18 and B18 are not actuated simultaneously and will prevent simultaneous operation of motors A8 and B8.

Relay R24, which is energized when the signal from the scale 16 corresponds to "O.K. Heavy," controls two other pairs of normally open contacts R24a and R24b. When R24a contacts are closed, due to energization of relay R24, the circuits in time delay control circuit A20 are connected to motor A8 to drive that motor in the same direction as for the "Heavy" signal but for a shorter period of time. The other normally open contacts R24b, controlled from relay R24, when closed, connects motor B8 to the control circuit B20 to drive the motor in a direction to decrease the amount of material filling the bag by a lesser amount than when relay R22 is energized. Similarly, relay R26 is energized when the signal from the scale 16 corresponds to "O.K. Light" and, when energized, closes two pairs of normally open contacts R26a and R26b to connect the time delay control circuit A20 to motor A8 to drive that motor in the reverse direction and to connect the time delay control circuit B20 to motor B8 to drive that motor in the reverse direction. Relay R28, when energized, closes its two pair of normally open contacts R28a and R28b to connect motors A8 and B8 respectively to the control circuits for energization in the reverse direction for longer periods of time.

It should be understood that the circuitry shown in FIG. 1 is simplified as compared to the actual circuit which includes other contacts controlled by relays R22, R24, R26, and R28 to insure against adjustment of the filling stations A2 and B2 simultaneously. The complete circuit is shown diagrammatically in FIG. 2 to which reference may now be had.

In FIG. 2 starter relays for motors A8 and B8 are indicated at AR42 and AR40, being the forward and reverse starter relays for motor A8, and at BR42 and BR40, being the forward and reverse starter relays for motor B8. Relays R22, R24, R26 and R28 are shown in FIG. 2 with one side of each connected to the power line L-2 and with the other side of each connected to leads identified "Heavy," "O.K. Heavy," "O.K. Light," and "Light," through which power is delivered from the scale 16. As heretofore indicated, the circuitry at the scale through which these control signals are obtained forms no part of the present invention and therefore has not been illustrated in the drawing. However, as an example as to what would constitute an acceptable circuit, we could have the movement of the weighing scale under the weight of a bag reflecting a light beam to one or another of four strategically placed photoelectric cells, the output of each of which is amplified and used for control of a relay. The relays in turn could control the circuits of relays R22, R24, R26 and R28. The weighing scale of Cunningham et al., U.S. Patent 2,732,067, could be readily modified to yield four signals rather than the three signals described in the patent.

In FIG. 2 the upper portion of the drawing comprises the control circuit associated with station A2. The trip switch A18 has its movable arm connected to the power line L-1 through a suitable fuse A32 and manually operable on-off switch A34. The fixed contact of trip switch A18 is connected through a pair of normally closed contacts AR34a to one end of the winding of a relay AR34, the other end of the winding of that relay being connected to line L-2. Relay AR34 is a time delay relay that picks up its armatures promptly upon energization but does not release its contacts for a predetermined time after de-energization. Contacts AR34a are controlled by relay AR34 as are normally open contacts AR34b.

In order to simplify the description, specific times of release or pick-up of contacts of the various control relays will be specified. More specifically, relay AR34, upon tripping of switch A18 by a bag passing to the scale 16, is energized and promptly opens its normally closed contacts AR34a and closes its normally open contacts AR34b. Opening of the normally closed contacts AR34a de-energizes relay AR34 but the relay does not release its contacts for 8 seconds following de-energization. Closure of contacts AR34b as a result of energization of relay AR34 closes the energizing circuit for relay AR36. Relay AR36 is a time delay relay that has a delay in picking up its contact with the result that the normally open contacts AR36a, controlled by relay AR36, do not close until 7 seconds after relay AR34 is energized. When contacts AR36a close at the end of 7 seconds, time delay relay AR38 is energized and closes its normally open contacts AR38a. Relay AR38 is so constructed as to keep its contacts closed for 1 second following de-energization of the relay. Thus, when the trip switch A18 is closed by passage of a filled bag over it, relay AR34 will be momentarily energized to close its contacts AR34b and to open its contacts AR34a. The relay keeps its contacts closed for 8 seconds. One second before relay AR34 opens its contacts AR34b, relay AR36 is energized and closes its contacts AR36a to energize relay AR38. By the end of 7 seconds from the tripping of switch A18, the bag has arrived at the weighing scale 16 and power is being supplied to one or the other relays R22, R24, R26 and R28. At the end of 8 seconds, relays AR34, AR36 and AR38 are de-energized and the contacts controlled by relays AR34 and AR36 have returned to normal whereas for 1 more second contacts AR38a controlled by relay AR38 remain closed.

The circuits for the energization of motor A8 for the "O.K." signals are controlled over contacts AR36a in the energizing circuit for relay AR38, whereas the circuits for energization of motor A8 in response to the signals beyond the tolerance range are controlled over contacts AR38a. Therefore, when the starter relay AR42 or AR40 is energized over contacts AR36a, the motor A8 will be energized for 1 second, whereas when the starter relay AR42 or AR40 is energized over contacts AR38a, the motor A8 will operate for 2 seconds.

The energizing circuit for starter relay AR42 when the signal is "O.K. Heavy" energizing relay R24 includes, in addition to the contacts AR36a, two sets of normally closed contacts BR42d and BR40d, of which contacts BR42d are open when the motor starter relay BR42 is energized and contacts BR40d open when motor starter relay BR40 is energized. This prevents the simultaneous operation of both motors A8 and B8. Included also in the circuit of motor starter AR42 is a pair of normally open contacts R24a which close when relay R24 is energized and a pair of normally closed contacts AR40c which open when motor starter relay AR40 is energized.

The energizing circuit for motor starter relay AR40 when the signal from the scale is "O.K. Light" energizing relay R26, is over the now closed normally open contacts AR36a, the normally closed contacts BR42d and BR40d and over normally open contacts R26a which close when relay R26 is energized and over normally closed contacts AR42c that open when motor starter relay AR42 is energized.

For energization of the motor starter relay AR42 when the signal is "Heavy," the circuit of starter relay AR42 is over the normally open contacts AR38a which remain closed for 1 second after relay AR38 is de-energized, normally open contacts R22a which are closed when relay R22 is energized and the normally closed contacts AR40c. Similarly, the circuit of starter relay AR40 when the signal is "Light" and relay R28 energized is over the normally open contacts AR38a, normally open contacts R28a which close when relay R28 is energized and the normally closed contacts AR42c.

The system includes also push button switches A64 and A66 for manually over-riding the control circuit to cause energization of the starter relays AR40 and AR42 respectively. When push button A64 is closed, motor starter relay AR40 is energized directly over switch A64 and the normally closed contacts AR42c whereas when push button A60 is closed, starter relay AR42 is energized directly over switch A66 and normally closed contacts AR40c.

Referring now to the circuit of motor A8, contacts AR40a and AR40b located in the motor circuit are normally opened but will close when relay AR40 is energized. When contacts AR40a and AR40b close, the leads E and G of the motor A8 will be connected to L-1 and leads H and F will be connected to L-2, causing the motor to rotate which in turn will cause the scale weight in the station machine A2 to increase the amount of material going into each bag. Contacts AR42a and AR42b, which are normally opened, close when relay AR42 is energized. When contacts AR42a and AR42b are closed, the leads E and F of motor A8 will be connected to L-1 and the leads G and H will be connected to L-2. This will cause the motor to rotate in a direction opposite to that when relay AR40 is energized. As explained before, the length of time the motor will run will depend as to whether the signals coming from the scale are "O.K. Heavy" or "O.K. Light," or "Heavy" or "Light."

The circuit for control of station B2 is the same as was just described for station A2, that is, when switch B18 is tripped the signals from the scale 16 will energize the relays R22, R24, R26 or R28 and relays BR34, BR36, or BR38 will in turn control the circuit of the motor starter relay for motor B8. Since the two circuits operate the same way, it is not deemed necessary to repeat the entire description for station B2.

It will be seen that by inserting in the control circuit for the starter relays for motor A8 switches that are open when the starter relays BR40 and BR42 are energized and by inserting in the control circuit of the starter relays for motor B8 switches that are open when starter relays AR42 and AR40 are energized, there is no possibility of conflict between the control of the respective motors should, by chance, the switches A18 and B18 be simultaneously tripped.

It will be further understood that applicant intends to cover all changes and modifications of the described form of the invention herein chosen for the purpose of illustration which do not constitute departures from the spirit and scope of the invention as defined by the accompanying claims.

We claim:

1. An automatic system for adjusting packing apparatus in order to maintain substantially constant weight of each filled package comprising means for conveying the filled packages from the packing apparatus, a weighing scale for receiving each package from said conveying means, a switch positioned to be closed by a package on said conveyor means when the package passes a predetermined location, a time delay control circuit including said switch, a reversible motor adapted when energized in one direction to adjust the packing apparatus to decrease the weight of material packed by the apparatus of an amount dependent upon the period of energization of the motor and when energized in the other direction to adjust the packing apparatus to increase the weight of material packed by an amount dependent upon the period of energization, a first, second, third and fourth relay, means for energizing said first relay when the weight of a filled package is more than a predetermined amount over a desired value, means for energizing said second relay when the weight of the filled package is more than said desired value but not more than said predetermined amount, means for energizing said third relay when the weight of the filled package is less than the desired value but by not more than said predetermined amount, and means for energizing said fourth relay when the weight of the filled package is less than the desired value by more than said predetermined amount, said first relay when energized coupling said motor to said control circuit for energizing said motor for a given period of time and in a direction to adjust the packing apparatus to decrease the weight of material packed in the next package, said second relay when energized coupling said motor to said control circuit for energizing said motor in the same direction and for a shorter period of time, said third relay when energized coupling said motor to said control circuit for energizing said motor in the other direction for such shorter period of time, and said fourth relay when energized coupling the motor to said control circuit for energizing said motor in the other direction for said predetermined period of time.

2. The system as specified in claim 1 wherein the said time delay control circuit comprises a fifth relay energized when said switch is closed, said fifth relay being adapted to hold its contacts in set position after de-energization for a predetermined time, a sixth relay which is energized when said fifth relay picks up its contacts, said sixth relay being adapted to delay the picking up its contacts for a predetermined time after energization, a seventh relay energized when said sixth relay picks up its contacts, said seventh relay being adapted to hold its contacts in set position for a predetermined time after de-energization, said sixth relay coupling said motor to a first motor starter relay when a predetermined signal is received from said scale and coupling the said motor to a second motor starter relay when a second signal is received from said scale, said seventh relay coupling said motor to said first motor starter relay when a third signal is received from said scale and coupling said motor to said second motor starter relay when a fourth signal is received from said scale.

3. An automatic system for adjusting packing machines in order to maintain substantially controlled weight in each filled package comprising means for conveying a filled package from each of at least two of said packing machines, a weighing scale for receiving each package from said conveyor means, a switch positioned to be closed by a package on said conveyor means when the package passes a predetermined location, at least two time delay control circuits including said switch, at least two reversible motors each adapted to adjust one of said packing machines to increase the weight of the material to be packaged when energized in one direction and to decrease the weight of the material to be packaged when energized in a second direction, means for transmitting data received from said scale in the form of electrical signals and relays selectively energized by said electrical signals, each relay when energized coupling the said motors to said control circuits for energizing said motors for a given period of time and in a direction to properly adjust the packing apparatus.

4. An automatic system for adjusting a packing machine in order to maintain substantially controlled weight in each filled package comprising means for conveying a filled package from the packing machine, a weighing scale for receiving each package from said conveyor means, a switch positioned to be closed by a package on said conveyor means when the package passes a predetermined location, a time delay control circuit including said switch, a reversible motor adapted to adjust said packing machine to increase the weight of the material to be packaged when energized in one direction and to decrease the weight of the material to be packaged when energized in a second direction, means for transmitting data received from said scale in the form of electrical signals and relays selectively energized by said electrical signals, each relay when energized coupling the said motor to said control circuit for energizing said motor for a given period of time and in a direction to properly adjust the packing machine, said relays consisting of four relays and the said time delay control circuit comprising a fifth relay energized when said switch is closed, said fifth relay being adapted to hold its contacts in set position after de-energization for a predetermined time, a sixth relay which is energized when said fifth relay picks up its contacts, said sixth relay being adapted to delay the picking up of its contacts for a predetermined time after energization, a seventh relay energized when said sixth relay picks up its contacts, said seventh relay being adapted to hold its contacts in set position for a predetermined time after de-energization, said sixth relay coupling said motor to a first motor starter relay when a predetermined signal is received from said scale and coupling the said motor to a second motor starter relay when a second signal is received from said scale, said seventh relay coupling said motor to said first motor starter relay when a third signal is received from said scale and coupling said motor to said second motor starter relay when a fourth signal is received from said scale.

5. The system as specified in claim 4 wherein said fifth relay will hold its contacts in set position after de-energization for a period of time sufficient to allow the filled package to reach said scale after closing said switch, and to allow said scale to transmit signals.

6. The system as specified in claim 4 wherein the said motor is energized by manually operated means through a circuit which will bypass said relay means and said time delay circuit.

References Cited by the Examiner

UNITED STATES PATENTS

| | | | |
|---|---|---|---|
| 2,688,459 | 9/1954 | Merrill et al. | 177—52 |
| 3,116,801 | 1/1964 | Bauder et al. | 177—50 |

RICHARD B. WILKINSON, *Primary Examiner.*

H. B. KATZ, *Assistant Examiner.*